(12) United States Patent  
Yamanashi et al.

(10) Patent No.: US 6,865,898 B2  
(45) Date of Patent: Mar. 15, 2005

(54) AIR CONDITIONING SYSTEM

(75) Inventors: Yoshiyukie Yamanashi, Shizuoka (JP); Keiji Satou, Fujikawa (JP); Masami Ozaki, Fujieda (JP); Masamichi Mochizuki, Fujinomiya (JP); Tatsuya Sugiyama, Shizuoka (JP); Noriyuki Bunkou, Shizuoka (JP)

(73) Assignee: Hitachi, Ltd., Tokyo (JP); trustee, in the benefit of Hitachi Air Conditioning Systems Co., Ltd.

( * ) Notice: Subject to any disclaimer, the term of this patent is extended or adjusted under 35 U.S.C. 154(b) by 0 days.

(21) Appl. No.: 10/601,630

(22) Filed: Jun. 24, 2003

(65) Prior Publication Data

US 2004/0010347 A1 Jan. 15, 2004

(30) Foreign Application Priority Data

Jun. 24, 2002 (JP) ....................................... 2002-182317

(51) Int. Cl.[7] .............................................. F25B 49/00
(52) U.S. Cl. .......................................... 62/132; 236/51
(58) Field of Search .......................... 62/132, 190, 129; 700/276, 277; 236/51

(56) References Cited

U.S. PATENT DOCUMENTS

| | | | | |
|---|---|---|---|---|
| 4,345,162 A | * | 8/1982 | Hammer et al. | .............. 307/39 |
| 5,640,153 A | * | 6/1997 | Hildebrand et al. | ......... 340/7.1 |
| 5,699,221 A | * | 12/1997 | O'Leary et al. | ............ 361/160 |
| 6,321,542 B1 | * | 11/2001 | Ueno et al. | ..................... 62/77 |
| 6,453,689 B2 | * | 9/2002 | Wada | ........................... 62/175 |
| 6,612,121 B2 | * | 9/2003 | Moon et al. | .................. 62/175 |
| 6,643,611 B1 | * | 11/2003 | Ito et al. | ..................... 702/184 |

FOREIGN PATENT DOCUMENTS

| | | | |
|---|---|---|---|
| JP | 401057041 A | * | 3/1989 |
| JP | A-5-272795 | | 10/1993 |
| JP | A-9-79654 | | 3/1997 |
| JP | 2001304664 A | * | 10/2001 |
| JP | 2001330295 A | * | 11/2001 |
| KR | 2001105684 a | * | 11/2001 |

* cited by examiner

*Primary Examiner*—William E. Tapolcai  
*Assistant Examiner*—Mohammad M. Ali  
(74) *Attorney, Agent, or Firm*—Antonelli, Terry, Stout & Kraus, LLP

(57) ABSTRACT

An air-conditioning system having a plurality of air conditioners, each air conditioner including an outdoor transmission/receiving unit for transmitting by superposing the operation data on an outdoor power line for supplying power to an outdoor unit and receiving the operation data superposed on the outdoor power line, an indoor transmission/receiving unit for transmitting by superposing the operation data on an indoor power line for supplying power to an indoor unit and receiving the operation data superposed on the indoor power line, an outdoor conversion unit for transmitting by converting the operation data superposed on the outdoor power line into a signal and receiving and superposing the signal on the outdoor power line, and an indoor conversion unit for transmitting by converting the operation data superposed on the indoor power line into a signal and receiving and superposing the signal on the indoor power line.

16 Claims, 4 Drawing Sheets

FIG. 4

```
OPERATION DATA DISPLAY

INDOOR : 1    OUTDOOR : 1

SAMPLE TIME · · · · · · · · · · · · · · · · · · · · · · · · 2002/06/01

ALARM CODE · · · · · · · · · · · · · · · · · · · · · · · 03

RUN/STOP · · · · · · · · · · · · · · · · · · · · · · · · · · RUN

OPERATION MODE · · · · · · · · · · · · · · · · · · · · COOLING

SET TEMPERATURE · · · · · · · · · · · · · · · · · · 22°C

OUTDOOR AIR TEMPERATURE · · · · · · · · · · 25°C
```

AIR CONDITIONING SYSTEM

BACKGROUND OF THE INVENTION

The present invention relates to an air-conditioning system comprising a plurality of indoor units and outdoor units connected thereto, or in particular to a large air-conditioning system used and suitably maintained in large buildings.

A conventional air-conditioning system of comparatively large scale is disclosed in JP-A-9-79654, for example, in which a plurality of air conditioners are known to be connected to a network through a gateway to meet the requirement of maintenance/control and system development.

An air-conditioning system is also described in JP-A-5-272795, wherein in order to reduce the cost of wiring various signal lines, the AC voltage of a power line for supplying power to the outdoor units and the indoor units is superposed with a power-line superposed signal such as a high-frequency signal of 10 to 450 kHz thereby to combine the signal line and the power line into a single common line.

In the prior art described above, a sufficient consideration fails to be given to the facts that the transmission line may be erroneously wired between the air conditioners, the operation data for the air conditioners are collected during the inspection work, the wiring distance is limited by the data deterioration due to the wiring length and the environment, and the voltage or the number of phases may be different between each outdoor unit and the corresponding indoor unit.

SUMMARY OF THE INVENTION

In view of the situation described above, the object of the present invention is to provide a layout-free air-conditioning system comprising a plurality of air conditioners having different voltages or different numbers of phases, in which the wiring error of the transmission line is eliminated and the inspection work is facilitated thereby to reduce the burden on the construction workers and the maintenance persons.

In order to achieve the object described above, according to this invention, there is provided an air-conditioning system comprising:

a plurality of indoor units and a plurality of outdoor units each including a compressor, the air-conditioning system being operatively controlled by transmitting and receiving the operation data between each of the indoor units and the corresponding one of the outdoor units;

an outdoor transmission/receiving unit included in each of the outdoor units for transmitting by superposing the operation data on an outdoor power line for supplying power to the outdoor units and receiving the operation data superposed on the outdoor power line;

an indoor transmission/receiving unit included in each of the indoor units for transmitting by superposing the operation data on an indoor power line for supplying power to the indoor units and receiving the operation data superposed on the indoor power line;

an outdoor conversion unit for transmitting by converting the operation data superposed on the outdoor power line into a radio signal and receiving and superposing the radio signal on the outdoor power line; and an indoor conversion unit for transmitting by converting the operation data superposed on the indoor power line into a radio signal and receiving and superposing the radio signal on the indoor power line.

In the air-conditioning system described above, the radio signal preferably contains the operation data and an identification signal for determining whether the radio signal is required to be received.

Further, in the air-conditioning system described above, a remote controller for setting the temperature preferably includes a transmission/receiving unit for receiving the radio signal.

Furthermore, the radio signal is preferably received by a portable telephone, and the operation data is displayed on the portable telephone.

In addition, the air-conditioning system described above is preferably such that the radio signal is transmitted from the portable telephone and received by the outdoor conversion unit or the indoor conversion unit thereby to control the operation.

Further, in the air-conditioning system described above, the radio signal preferably contains a source address and a destination address as well as the operation data.

Furthermore, in the air-conditioning system described above, the radio signal preferably contains the operation data and an identification signal for determining whether the radio signal is required to be received, and upon determination by the identification signal that the radio signal is required to be received, the outdoor conversion unit and the indoor conversion unit sample the radio signal and converts it into a power-superposed signal.

What is more, in the air-conditioning system described above, the operation data is preferably received as a radio signal by and stored in a portable telephone.

Other objects, features and advantages of the invention will become apparent from the following description of the embodiments of the invention taken in conjunction with the accompanying drawings.

BRIEF DESCRIPTION OF THE DRAWINGS

FIG. 4 is a plan view showing the display screen of a portable telephone according to an embodiment of the invention.

DESCRIPTION OF THE EMBODIMENTS

Figure 1:
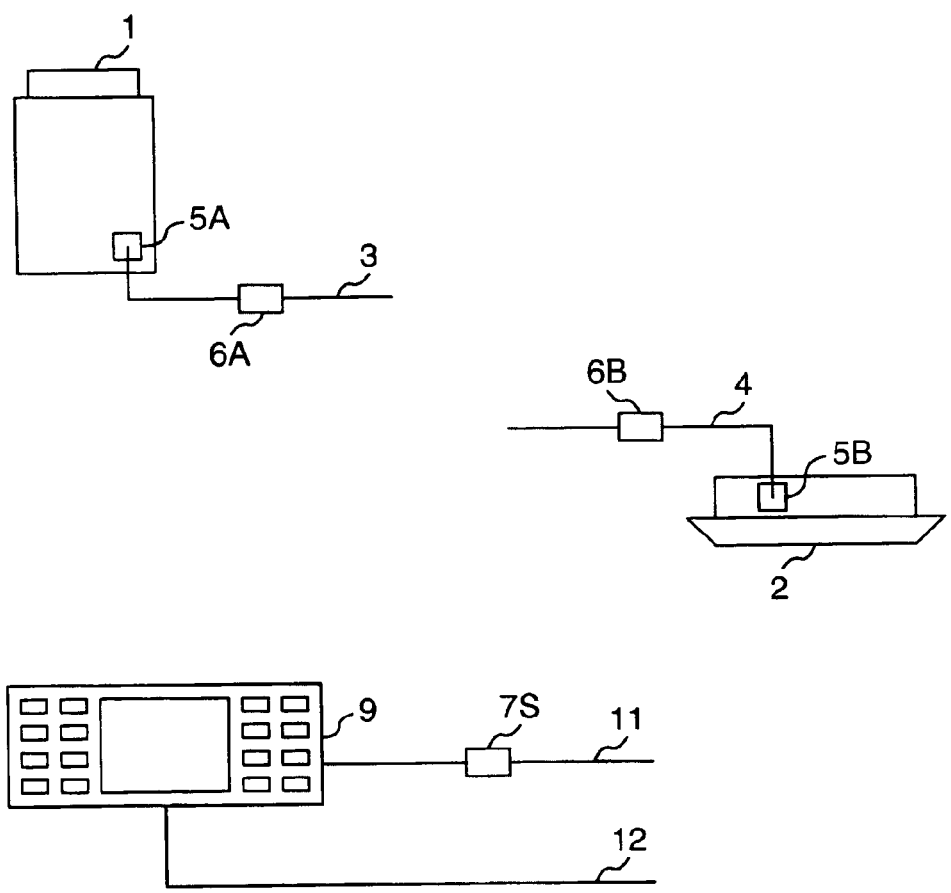
FIG. 1 is a block diagram showing an air-conditioning system according to an embodiment of the invention.

An embodiment of the invention will be described in detail below with reference to the accompanying drawings. FIG. 1 is a diagram showing a configuration of an air conditioner comprising a power line connected with an outdoor unit 1 having a compressor mounted thereon, a power line 4 connected with an indoor unit 2, conversion units 6A, 6B for converting a signal superposed on the power line into a radio signal, and a central control unit 9 for controlling the operation of the air conditioner, wherein the outdoor unit 1 and the indoor unit 2 are interconnected by a pipe thereby to constitute a refrigeration cycle.

The outdoor unit 1 is supplied with three-phase AC power of 200 V from the outdoor power line 3 and has mounted thereon an outdoor transmission/receiving unit 5A for the power-line superposed signal. The data (transmission information) defined as a basic format is transmitted to the outdoor power line 3 through the outdoor transmission/receiving unit 5A for the power-line superposed signal. The data include the outdoor air temperature, the temperature of the gas discharged from the compressor, the condensing temperature thereof, the high pressure and the low pressure, the drive frequency, the current value of the compressor, the opening degree of an expansion valve and the capability code. The basic format includes the data identification code, the length indicating the data length, information about an air-conditioning system in the address, the source address, information about an air-conditioning system in the destination address and the destination address. The power-superposed data is converted into a radio signal by the outdoor conversion unit 6A for the power-line superposed signal and the radio signal. In this signal conversion, the basic format of the outdoor transmission/receiving unit 5A has an exclusive bit for transmitting the radio signal with the flag set for the bit as an identification signal. This identification signal facilitates the avoidance of an interference of the radio data. The radio signal has a frequency band of 2.4 GHz or 5.2 GHz since the lamp line or the radio line is used as transmission media.

The indoor unit 2 is supplied with power from the indoor power line 4 of single phase, 100 V, and has mounted thereon the indoor transmission/receiving unit 5B. The indoor power line 4 is provided with the indoor conversion unit 6B. Further, the indoor conversion unit 6B at the data receiving end monitors the exclusive bit of the received data and determines from the state of the flag whether the data is the one to be received or not. Specifically, the radio data transmission unit and the radio data receiving unit for communication of the radio data are set with each other in advance to raise a flag with the same bit by the switches included in the radio data conversion units 6A, 6B. The data thus converted into a radio signal is transmitted with a flag raised to the set bit. At the receiving end, the set bit is monitored and it is determined from the status of the flag whether the data is transmitted from the legitimate party of communication. Once it is determined at the receiving end that the received data is transmitted from the legitimate party of communication, the indoor conversion unit 6B samples the radio signal for optimization of transmission, converts the data into the power-superposed signal after shaping the waveform thereof, and transmits it to the indoor transmission/receiving unit 5B through the power line 4. By sampling the data at the time of conversion from a radio signal to a cable signal, the optimization is carried out in terms of waveform shaping. In this way, the data deterioration is suppressed while at the same time making it possible to extend the wiring distance.

In collecting data by inspection of the air conditioner, a dedicated line for data is conventionally required to be connected to the air conditioner. The air conditioner according to this invention, in contrast, requires no such dedicated line but has the function of receiving a radio signal. In the case where the operation data in the form of a radio signal is received using a portable telephone, for example, the data can be collected and confirmed at any place where the radio signal reaches. Utilizing this fact, the wiring error of the transmission line between the air conditioners can be prevented.

The foregoing description refers to the data transmission from the outdoor unit 1 to the indoor unit 2. The data transmission from the indoor unit 2 to the outdoor unit 1 follows the reverse route.

The data is transmitted to the central control unit 9 for centralized control of a plurality of the outdoor units 1 and the indoor units 2 using a radio signal sent from the outdoor conversion unit 6A or the indoor conversion unit 6B to a central conversion unit 7S. The central conversion unit 7S converts the radio data to a signal transmissible on a transmission line 11. Also, the central control unit 9 is supplied with power of single phase, 100 V, from the central power line 12.

Figure 2:
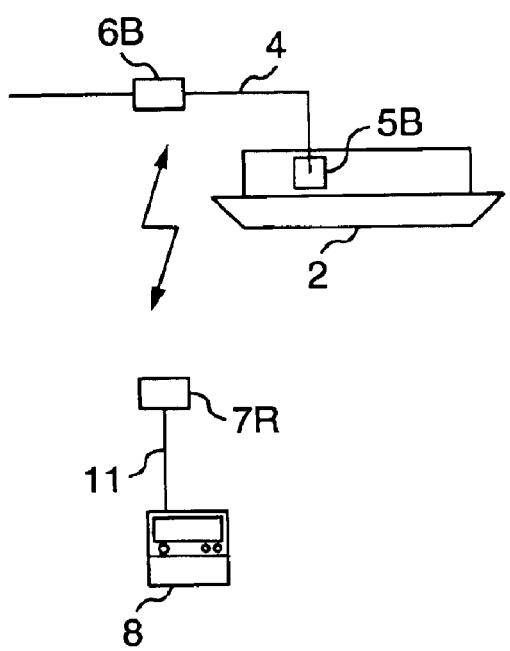
FIG. 2 is a block diagram showing a remote controller according to an embodiment of the invention.

FIG. 2 shows the relation between the indoor unit 2 and a remote controller 8 for setting the operation mode of cooling and heating, the room temperature and the direction of wind. The indoor unit 2 is supplied with power from the indoor power line 4 and has mounted thereon the transmission/receiving unit 5B for the power-line superposed signal. The indoor unit 2 thus transmits the data to the indoor power line 4 through the indoor transmission/receiving unit 5B for the power-line superposed signal. The indoor conversion unit 6B converts the power-superposed data into a radio signal. The radio signal thus converted is transmitted with the flag raised to make clear that the exclusive bit for identification included in the basic format represents the power-superposed data. The frequency band of the radio signal is 1 to 10 GHz, or preferably, 2.4 GHz. The remote controlled conversion unit 7R mounted on the transmission line 11 of the remote controller 8 at the receiving end monitors the exclusive bit of the received data, and determines whether the data is communicable according to the presence/absence or the status of the flag with regard to the source line and source address.

The remote controlled conversion unit 7R, once determined that the data is received from the legitimate party of communication, samples the data and receives the radio data after optimizing it by waveform shaping or the like. Also, the data is transmitted from the remote controller 8 to the indoor unit 2 through the reverse route.

Figure 3:
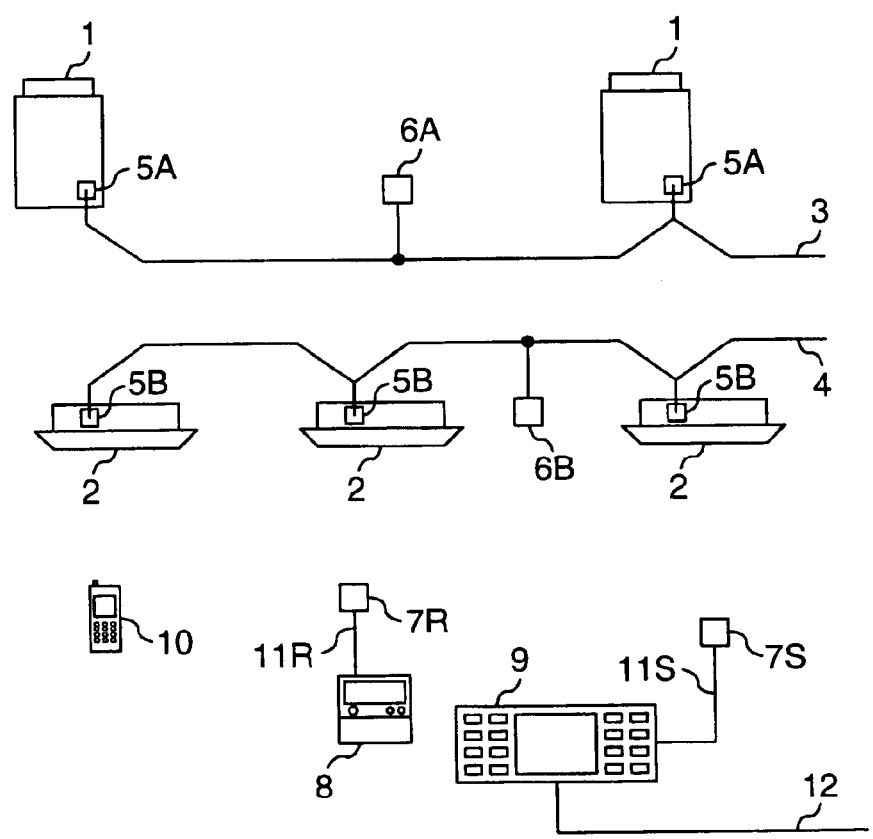
FIG. 3 is a block diagram showing an air-conditioning system according to another embodiment of the invention.

FIG. 3 shows the state in which a plurality of the outdoor units 1 and a plurality of the indoor units 2 are connected, and the relation of the outdoor units 1 and the indoor units 2 with the portable telephone 10.

The air conditioner 1 has mounted thereon the outdoor transmission/receiving unit 5A for the power-superposed signal, and transmits the data to the outdoor power line 3 through the outdoor transmission/receiving unit 5A for the power-superposed signal. The power-superposed data is converted into a radio signal by the outdoor conversion unit 6A for conversion from the power-superposed signal into a radio signal. In the process, the radio signal is transmitted with the flat raised with an exclusive bit based on the contents set by the outdoor transmission/receiving unit 5A. The frequency band of the radio signal is 2.4 GHz. The portable telephone 10 at the receiving end of the radio signal monitors the exclusive bit of the received data and determines from the status of the flag whether the data is legitimate for communication.

The portable telephone 10 at the receiving end, upon determination that the received data is transmitted from the legitimate party of communication, extracts from the received data such data as the address numbers, the run/stop choice, the cooling/heating operation mode, the set temperature, the model code and the fault code of the connected indoor unit 2 and the corresponding outdoor unit 1. FIG. 4 shows an example of a liquid crystal display making up the screen of the portable telephone 10, in which the operation data displayed in characters include the address "INDOOR: 1" of the indoor unit 1 and the address "OUTDOOR: 1" of the corresponding outdoor unit. Also, the date of data extraction is indicated on the screen numerically, for example, as "2002/06/01", the fault code as "ALARM CODE: 03", the present operating condition as "RUN/STOP: RUN", the cooling/heating mode as "OPERATION MODE: COOLING", the set temperature as "SET TEMP: 22° C." and "OUTDOOR AIR TEMP: 25° C.". The extracted data are recorded in the internal storage unit of the portable telephone 10 and used for maintenance and inspection.

As described above, even in the case where the indoor unit 2 and the outdoor unit 1 of the air conditioner have different voltages and different numbers of phases, or single phase, 100V, 50 Hz for the indoor unit 2, and three phases, 200 V for the outdoor unit 1, for example, the data exchanged between the indoor unit 2 and the outdoor unit 1 are converted into a power-superposed signal and then transmitted as a radio signal. Therefore, the wiring can be laid easily and the variance of arrangement of air conditioners can be increased.

Also, the operation data including the atmospheric temperature, the temperature of the gas discharged from the compressor, the condensation temperature thereof, the high pressure and the low pressure, the drive frequency and the current value of the compressor, the opening degree of the expansion valve, the capability code and the fault code can be extracted more easily using the portable telephone 10.

Further, the operating condition of each air conditioner and the data transmission between the air conditioners can be monitored by the portable telephone 10 having the function of transmitting and receiving the radio signal. Specifically, the portable telephone 10 at the receiving end determines whether the other party is legitimate for communication or not according to the status of the flag of an exclusive bit. The collected information to be monitored include the operating information (operation data) of each air conditioner, including the set temperature, the intake air temperature, the blowout air temperature, the indoor heat exchange temperature, the remote sensor temperature and the atmospheric temperature selected as desired by the user.

It will thus be understood from the foregoing description that according to this invention, even with a comparatively large air conditioning system including a plurality of air conditioners, the construction, the maintenance/management and the system development can be facilitated regardless of the wiring distance or the difference of the voltage or the number of phases between the outdoor unit and the indoor unit.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An air-conditioning system comprising:
    a plurality of indoor units and a plurality of outdoor units each including a compressor, operatively controlled to transmit and receive operation data;
    an outdoor transmission/receiving unit included in each of said outdoor units, for transmitting by superposing operation data on an outdoor power line for supplying power to said outdoor units and receiving said operation data superposed on said outdoor power line;
    an indoor transmission/receiving unit included in each of said indoor units, for transmitting by superposing operation data on an indoor power line for supplying power to said indoor units and receiving said operation data superposed on said indoor power line;
    an outdoor conversion unit for transmitting a radio signal produced by converting said operation data superposed on said outdoor power line into the radio signal, and receiving and superposing a radio signal on said outdoor power line; and
    an indoor conversion unit for transmitting a radio signal produced by converting said operation data superposed on said indoor power line into the radio signal and receiving and superposing a radio signal on said indoor power line,
    wherein an identification signal is assigned to each of said outdoor and indoor conversion units, and said radio signal contains operation data and a flag information representing the identification signal, and
    wherein each of said outdoor and indoor conversion units determines whether a received radio signal is required to be received from a desired conversion unit based on the identification signal contained in the received radio signal, and when the received radio signal is required to be received from the desired conversion unit, samples and converts the received radio signal into a power-superposed signal.

2. An air-conditioning system according to claim 1, wherein each of the outdoor conversion unit and the indoor conversion unit includes a radio signal transmission/reception module for wireless transmission/reception of the radio signal including operation data between the outdoor unit and the corresponding indoor unit.

3. An air-conditioning system according to claim 1, further comprising a remote controller for setting the temperature, said remote controller including a transmission/receiving unit for receiving said radio signal.

4. An air-conditioning system according to claim 1, further comprising a portable telephone provided to receive said radio signal and to provide a visual display of said operation data thereon.

5. An air-conditioning system according to claim 1, further comprising a portable telephone provided to transmit a radio signal to be received by a selected one of said outdoor conversion unit and said indoor conversion unit thereby to control operation of said air-conditioning system.

6. An air-conditioning system according to claim 1, wherein said radio signal contains said operation data, a source address and a destination address.

7. An air-conditioning system according to claim 1, wherein said outdoor conversion unit and said indoor conversion unit sample said received radio signal to reproduce operation data and convert said operation data into a power-superposed signal after shaping a waveform of said operation data.

8. An air-conditioning system according to claim 1, wherein said operation data is received as a radio signal by a portable telephone, and is stored therein.

9. An air-conditioning system according to claim 1, wherein said operation data include the outdoor air temperature, the temperature of gas discharged from the compressor, the condensation temperature, the high/low pressure, the drive frequency, the current value of the compressor, the opening degree of expansion valves and capability codes.

10. An air conditioning system comprising:
    one or more outdoor units provided with an outdoor power line for supplying power thereto, each having a compressor mounted thereon to generate compressed air;
    one or more indoor units arranged to handle compressed air received from the one or more outdoor units, and provided with an indoor power line for supplying power thereto;

an outdoor transmission/reception unit included in each of the one or more outdoor units, to transmit and receive operation data superposed on the outdoor power line;

an indoor transmission/reception unit included in each of the one or more indoor units, to transmit and receive operation data superposed on the indoor power line;

an outdoor conversion unit coupled to the outdoor power line, to convert operation data superposed on the outdoor power line into a radio signal for wireless transmission, and to receive a radio signal, via wireless communication, and superpose operation data included in the radio signal received on the outdoor power line; and an indoor conversion unit coupled to the indoor power line, to receive the radio signal transmitted from the outdoor conversion unit, via wireless communication, and superpose operation data included in the radio signal on the indoor power line, and to convert operation data superposed on the indoor power line into a radio signal for wireless transmission to the outdoor conversion unit;

wherein a unique ID is assigned to each of the outdoor conversion unit and the indoor conversion unit, and the radio signal transmitted from one of the outdoor conversion unit and the indoor conversion unit includes operation data and flag information representing the unique ID, and wherein each of the outdoor conversion unit and the indoor conversion unit receives and processes the radio signal based on the unique ID assigned thereto.

11. The air conditioning system according to claim 10, wherein each of the outdoor conversion unit and the indoor conversion unit includes a radio signal transmission/reception module for wireless transmission/reception of the radio signal including operation data between the outdoor unit and the corresponding indoor unit.

12. The air conditioning system according to claim 10, further comprising a centralized controller arranged to provide centralized control of the one or more outdoor units and indoor units based on the radio signal transmitted from one of the outdoor conversion unit and the indoor conversion unit.

13. The air conditioning system according to claim 10, wherein the operation data include, but not limited thereto, the outdoor air temperature, the temperature of gas discharged from the compressor, the condensation temperature, the high/low pressure, the drive frequency, the current value of the compressor, the opening degree of expansion valves and capability codes of the air conditioning system.

14. The air conditioning system according to claim 10, further comprising a remote controller for setting the operation data including, but not limited to, selected ones of the outdoor air temperature, the temperature of gas discharged from the compressor, the condensation temperature, the high/low pressure, the drive frequency, the current value of the compressor, the opening degree of expansion valves and capability codes of the air conditioning system.

15. The air conditioning system according to claim 14, wherein the remote controller includes a radio signal transmission/reception module for wireless transmission/reception of the radio signal including operation data between the outdoor unit and the corresponding indoor unit.

16. The air conditioning system according to claim 10, further comprising a portable telephone to receive the radio signal transmitted from one of the outdoor conversion unit and the indoor conversion unit, the portable telephone providing a visual display of operation data, including the desired outdoor/indoor unit, the set temperature, the intake air temperature, the blowout air temperature, the indoor heat exchange temperature, the remote sensor temperature and the atmospheric temperature and other operation modes.

* * * * *